United States Patent [19]

Smith

[11] Patent Number: 6,167,274

[45] Date of Patent: *Dec. 26, 2000

[54] METHOD FOR LOCATING A MOBILE STATION

[75] Inventor: Adrian David Smith, Kirkland, Wash.

[73] Assignee: AT&T Wireless Svcs. Inc., Redmond, Wash.

[*] Notice: This patent issued on a continued prosecution application filed under 37 CFR 1.53(d), and is subject to the twenty year patent term provisions of 35 U.S.C. 154(a)(2).

[21] Appl. No.: 08/868,402

[22] Filed: Jun. 3, 1997

[51] Int. Cl.$^7$ ...................................................... H04Q 7/20
[52] U.S. Cl. ...................... 455/456; 455/457; 342/357.01
[58] Field of Search .................................. 455/404, 456, 455/457, 517, 521, 524, 426; 342/357.01, 457, 357.13

[56] References Cited

U.S. PATENT DOCUMENTS

| | | |
|---|---|---|
| 5,055,851 | 10/1991 | Sheffer . |
| 5,208,756 | 5/1993 | Song ........................................ 364/449 |
| 5,218,367 | 6/1993 | Sheffer et al. . |
| 5,327,144 | 7/1994 | Stilp et al. . |
| 5,388,147 | 2/1995 | Grimes . |
| 5,394,158 | 2/1995 | Chia . |
| 5,396,540 | 3/1995 | Gooch ....................................... 379/59 |
| 5,508,708 | 4/1996 | Ghosh et al. . |
| 5,542,100 | 7/1996 | Hatakeyama ........................... 455/56.1 |
| 5,561,840 | 10/1996 | Alvesalo et al. . |
| 5,570,412 | 10/1996 | LeBlanc . |
| 5,594,425 | 1/1997 | Ladner et al. . |
| 5,613,205 | 3/1997 | Dufour ................................... 455/33.2 |
| 5,678,194 | 10/1997 | Grube et al. ............................ 455/456 |
| 5,844,522 | 12/1998 | Sheffer et al. .......................... 342/457 |
| 5,854,981 | 12/1998 | Wallstedt et al. ....................... 455/439 |
| 5,859,612 | 1/1999 | Gillhousen ............................. 342/457 |
| 5,873,040 | 2/1999 | Dunn et al. ............................. 455/456 |
| 5,913,170 | 6/1999 | Worthham .............................. 455/457 |
| 5,946,611 | 8/1999 | Dennison et al. ...................... 455/404 |
| 5,960,341 | 9/1999 | LeBlanc et al. ........................ 455/426 |
| 5,970,414 | 10/1999 | Bi et al. .................................. 455/456 |
| 5,991,758 | 12/1999 | Ellard ......................................... 707/6 |

FOREIGN PATENT DOCUMENTS 2295591  8/1997  Canada .

*Primary Examiner*—Edward F. Urban
*Assistant Examiner*—Congvan Tran

[57] ABSTRACT

A method provides for the detection of the geographic location of a mobile station within a mobile network. The mobile station detects signal characteristics for signals generated by neighboring cells to create a report of signal characteristics corresponding to the location at which the mobile station resides. This report is then compared against the database of signal signatures identifying geographic locations within the cell in which the mobile station is known to be positioned. The signal signatures are then used to detect either an exact match or an approximate match to give position information of the mobile station within the cell.

6 Claims, 3 Drawing Sheets

| FREQUENCY | SIGNAL STRENGTH |
|---|---|
| $F_1$ | |
| $F_2$ | ⋮ |
| $F_3$ | |
| ⋮ | |

| LONGITUDE/LATITUDE | NEIGHBORING CELL SIGNAL CHARACTERISTIC |
|---|---|
| $X_1 / Y_1$ | $S_{f2}$  $S_{f3}$  $S_{f4}$  .... |
| $X_2 / Y_2$ | $S'_{f2}$  $S'_{f3}$  $S'_{f4}$  .... |
| $X_1 / Y_2$ | $S''_{f2}$  $S''_{f3}$  $S''_{f4}$  .... |
| ⋮ | ⋮ |

500 — (first row location); 510 — (first row characteristics)

METHOD FOR LOCATING A MOBILE STATION

BACKGROUND OF THE INVENTION

The present invention relates to a method for locating a mobile station. More particularly, the present invention relates to detecting the position of a mobile station in a cell area based on certain received signal characteristics.

In emergency situations it is critical to know the location of the emergency and where help needs to be sent. This is easily done with communication systems that are wired. For instance, it is well known that when a wire line subscriber activates an emergency code such as "911" facilities can determine the location of the user so that assistance can be sent to that location.

It is equally important to provide emergency assistance to those who may not have access to a wire line connection, such as a person in a vehicle. Such persons may utilize mobile communication devices such as mobile cellular phones. However, it is more difficult to provide such assistance just by the nature of the communication instrument, in that the instrument can be moved to many different locations. Thus, it would be desirable to provide a method by which the location of a mobile station could be determined quickly and simply.

A number of prior systems for mobile system location identification have detected signal strengths to perform triangulation. This is a complex solution which requires real time calculations related to signal strength measurements. A more simple solution to the problem is desirable.

SUMMARY OF THE INVENTION

The present invention provides a method for locating mobile stations which uses signal strength information in a new manner. In particular, in an embodiment of the present invention a mobile station is advised of the channel frequencies of the neighboring cells. The station then measures signal parameters with respect to these neighboring cell frequencies. The compiled signal measurements are transmitted back to a central processing station via the mobile communications network. A database at that central processing station stores signal measurements corresponding to locations within the cell in which the mobile station is located. The central processor searches the database for a signal measurement that matches the received signal measurements. If a match is found then the geographic location corresponding to the signal measurement is selected as the geographic location of the mobile station. If, however, the central processor does not detect an exact match for the signal signature then the processor may select the closest matching signal signature and use the corresponding location as being representative of the location of the mobile station. Alternatively the processor could calculate an approximate location based on location information corresponding to the N closest signal measurements.

The present invention reduces the location operation to a simple task of searching a database for matching information. Such a technique could also be used to enhance the accuracy of a triangulation technique.

DETAILED DESCRIPTION

Figures 1, 2:
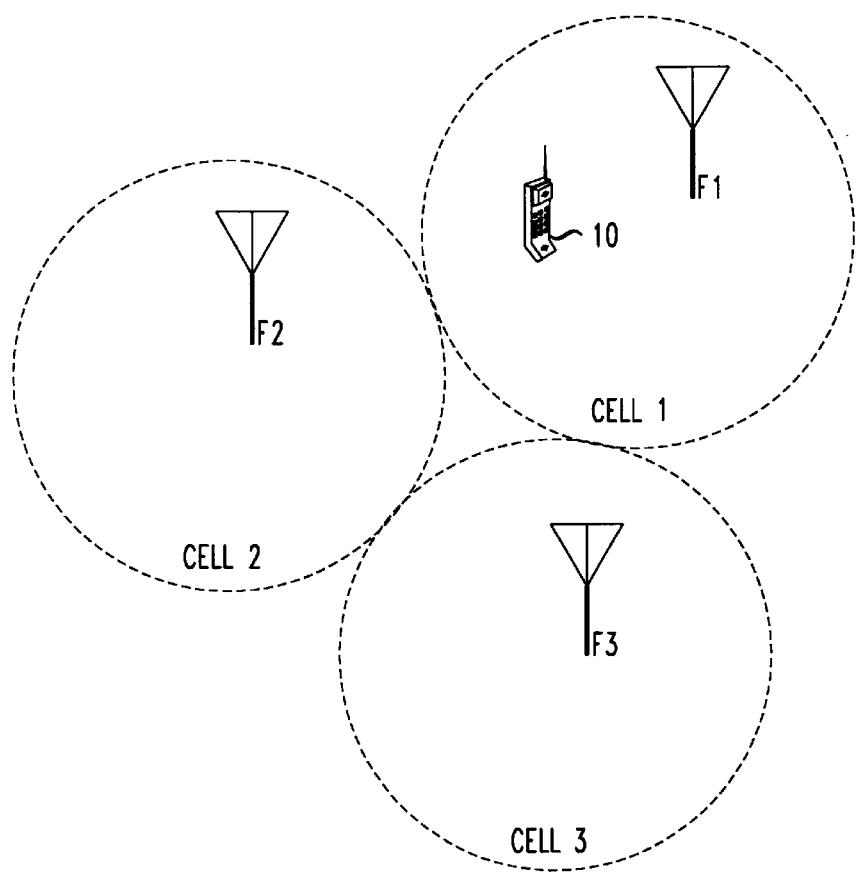
FIG. 1 illustrates an example of a mobile cellular configuration in which the present invention may be employed.
FIG. 2 illustrates an example of a table of information which can be utilized in an embodiment of the present invention.

FIG. 1 illustrates in schematic form the layout of a cellular network in which the present invention can be employed. Three cells are shown: cell 1, cell 2, and cell 3. Each cell has its own set of channels, for example a control channel and voice channels, for providing over-the-air communications with mobile stations. In the example shown, cell 1 has a channel having frequency f1, cell 2 has a channel with frequency f2 and cell 3 has a channel with frequency f3. Each cell may have multiple frequencies, but only one frequency is shown here for ease of description. In the example, a handheld device 10 is shown located within cell 1.

The present invention provides a method for locating the mobile station 10 at some geographic position within the geographic serving area of the cellular system of cell 1.

It is known in existing mobile systems to advise the handheld device 10, while it is in cell 1, of the frequencies used by the cells neighboring cell 1, for example, frequency f2 for cell 2 and frequency f3 for cell 3. This information is useful in at least two situations.

First, the mobile station may be registered in the mobile network, but may not presently be involved in a communication, that is, it is in an idle mode. In that mode the mobile selects a control channel based on certain signal criteria. Under those circumstances while the mobile is being moved, it is possible that a time will come when the mobile is located such that it is more optimal to select the control channel of either cell 2 or cell 3 rather than the control channel of cell 1. This is known as a re-selection process. The mobile makes this determination by periodically measuring the signal strengths of the control channels of the neighboring cells. An algorithm is performed using those measurements and the mobile then determines whether to re-select the frequency of one of the neighboring cells. This information can be sent back to the system to aid in channel allocation. This is referred to as Mobile Assisted Channel Allocation (MACA).

A second situation in which the signal characteristics of the neighboring cell channels are useful relates to those occasions when a mobile station is involved in a communication while moving through a given cell and reaches the outer perimeter of that cell and needs to be handed-off to a neighboring cell. This is referred to as Mobile Assisted Hand Off (MAHO). In this situation, the mobile station detects signal characteristics of the neighboring cells and transmits that characteristic information back to the cellular system so that the system can coordinate a hand-off of the mobile station from one cell to another as it traverses cells.

These two operations MACA and MAHO are described in detail in the IS-136 protocol specifications. (TIA/EIA/IS-136.1-A October 1996).

The present invention takes advantage of these known operations that detect the signal strength of signals from neighboring cells. An embodiment of the present invention provides that the mobile station is advised of the channel frequencies of the neighboring cells and is requested to perform a signal measurement that detects certain parameter (s) that characterize the signals from the neighboring cells. An example of a table correlating the neighboring cell signals (f1, f2, f3) to a signal parameter such as signal strength is shown in FIG. 2. The present invention relies on the concept that each geographic location within a given cell site has its own "signal signature". By this it is meant that given a sufficiently large number of neighboring cell signals, the detected set of parameters of those signals at a given location will be unique.

Figure 4:
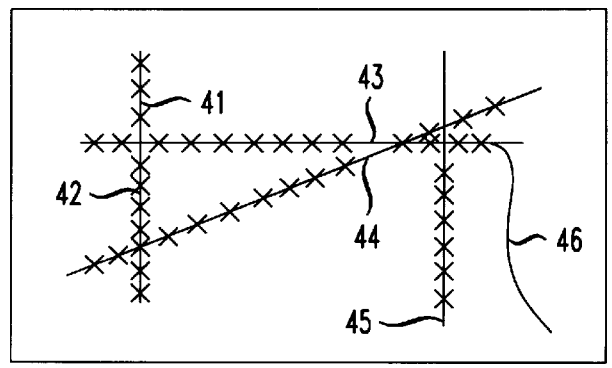
FIG. 4 illustrates a sample map of a region within a cell for purposes of explaining how to create a database to be used in conjunction with the present invention.

A database for use in the location operation can be generated with this idea in mind. FIG. 4 illustrates a sample cell area where there are six roads or routes shown (41 to 46) that are normally traversed by mobile stations. Each "X" marks a geographic location on one of the roads at which measurements can be made with respect to the signals coming from neighboring cells. A network operator could collect this data during a normal course of drive testing along these roads within a cell. This would mean placing a call on a phone connected to a personal computer (PC) which gathers mobile assisted hand-off or mobile assisted channel allocation information. The computer would also have a global position system (GPS) card to collect latitude and longitude information to geographically fix the information. The collection equipment could be automated and placed in taxi cabs, delivery vehicles, buses, or other vehicles which commonly traverse the cell.

To improve the signature which is associated with each geographic location, the data could be collected and averaged so that real time variations in the signal parameters such as those owing to RF conditions, fading, tree leaves, trucks, buses, etc., would be removed from the data. It may be further beneficial to create a rolling time average to take into account changes in the landscape, such as new building construction, which could effect the signal parameters. In collecting information this way a database will be created that contains the latitude, longitude, frequency and signal parameters of all of the test positions in the cell. Of course, this process could then be repeated for each of the cells throughout the system. The result is that the database creates, for each cell, a set of signal signatures which specifically identify geographic locations within the cell. It may be difficult to physically detect a signal signature for every location within a cell. In that circumstance the signal signature for particular locations may be detected and signatures for other locations may be extrapolated from the detected information.

In the embodiment which is presently described the signal parameter which is measured by the mobile station is the signal strength of the neighboring cell site signals. However, it is envisioned that other signal parameters which may vary with location or distance from a given transmitter and which can be used to create a substantially unique signal signature for a geographic location could be used either in conjunction with signal strength or as alternatives to signal strength.

Figure 3:
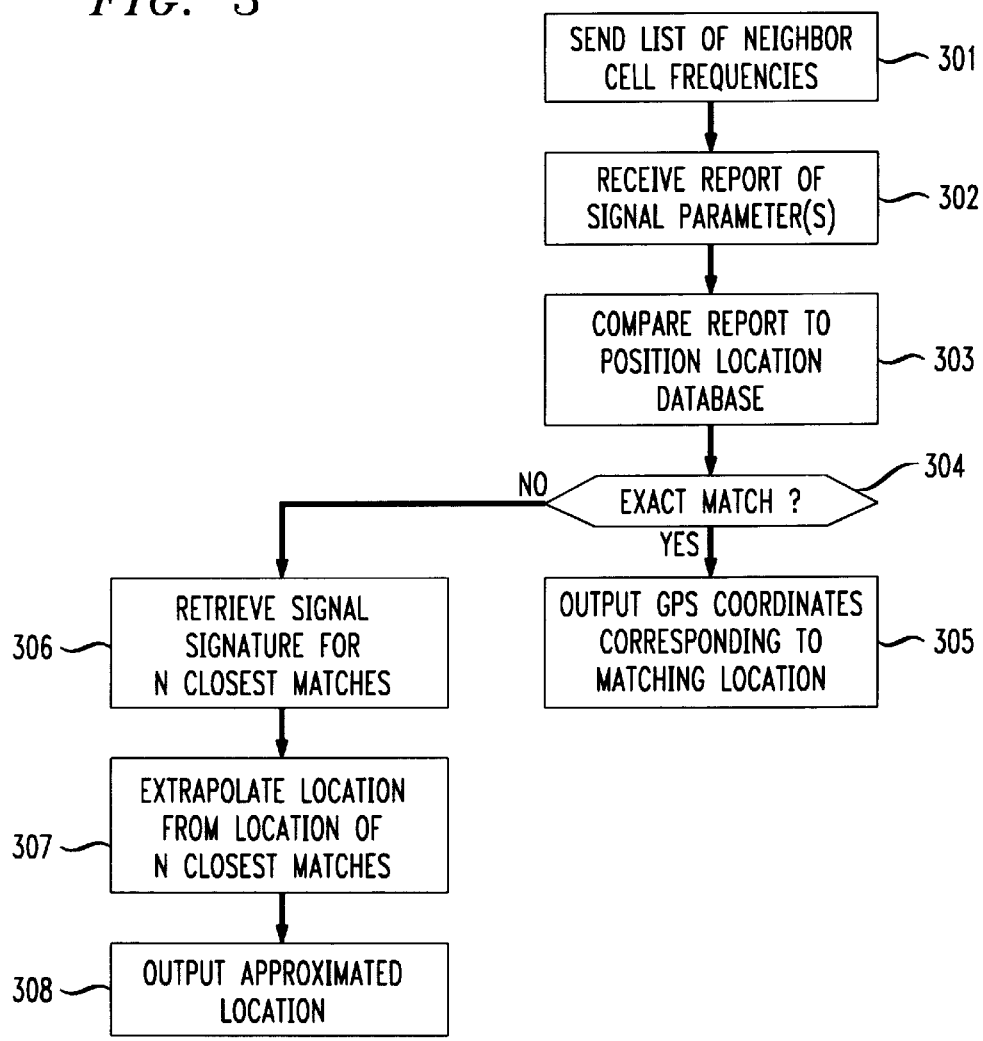
FIG. 3 illustrates a flow chart of a method in accordance with an embodiment of the present invention.

FIG. 3 illustrates a flow chart for one embodiment of a method for detecting mobile station location in accordance with the present invention. The method could be executed upon receipt of a distress or emergency call. Alternatively, the method could be executed in response to a location request from the mobile station. The method also has applicability in monitoring or tracking the location of a fleet of vehicles.

First, a list of neighbor cell frequencies is sent to the mobile station, step 301. The central processor then receives a report of signal parameters for the cell frequencies from the mobile station, step 302. These parameters could include such signal characteristics as signal strength. Once the central processor has received the report it compares the report to information in a position location database, step 303. Such a database can be generated as described above with reference FIG. 4.

Figures 5, 6:
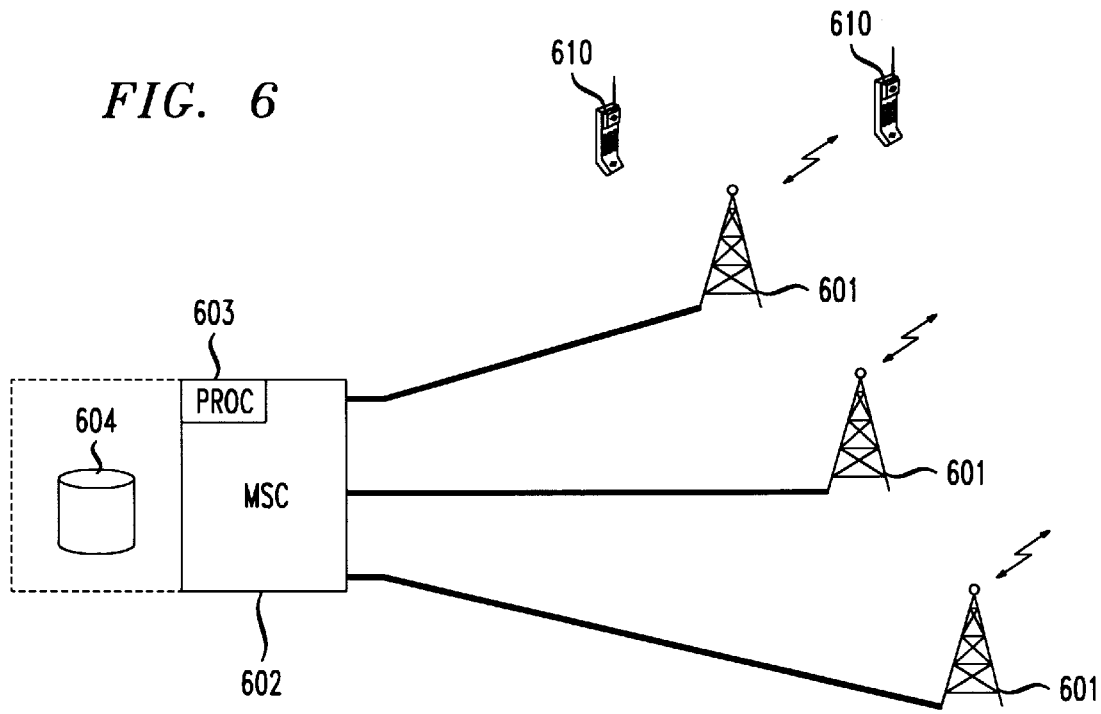
FIG. 5 illustrates an example of a database entry in an embodiment of the present invention.
FIG. 6 illustrates, in block diagram form, an example of a system employing the present invention.

FIG. 5 illustrates an example of entries in such a position location database. Here a given position defined by longitude, latitude (500) is associated with a set of signal parameters, e.g., signal strengths of signals of neighboring cells (510).

The searching operation determines whether there is a signal signature in the database which is an exact match for the received report, step 304. If such an exact match exists then the method proceeds to output the global position system (GPS) coordinates corresponding to that matching location and which are stored in the database together with the signal signatures, step 305. If, however, there is no exact match, then in the method shown in FIG. 3, the processor retrieves the signal signature for the "N" (e.g., N=1, 2, 3, etc.) closest matches to the received report, step 306. The processor then extrapolates a location corresponding to signal parameters in the received report from the locations of the N closest matches in accordance with a predetermined algorithm, step 307. The system then outputs an approximate location based on the extrapolation, step 308. The number of closest matches can be selected on the basis of various criteria such as how closely the closest match in fact matches the report and the precision of the algorithm for extrapolating the location information. The algorithm could also take into account that the data is collected on the routes that were used to create the database. The algorithm can also consider whether the mobile stations were used inside of homes, offices or other buildings. The model can take into account path loss models for the vicinity, hand-off boundaries and the position of the cell sites relative to the point of collection. Other factors may also be considered in accordance with the signal characteristics which are being relied upon for representing the signal signature of a geographic location. In one embodiment the location information could be extrapolated with a simple averaging technique relying on a number of geographic locations surrounding the location which has generated the reported set of measurements.

In an alternative arrangement the mobile station could be approximated to be located at or about the position of the closest matching signal signature.

Once the position is determined or approximated that information can be provided so as to dispatch assistance to the subscriber at the station.

FIG. 6 illustrates a block diagram representation of a system employing a present invention. Base Stations 601 are provided for a plurality of neighboring cells. The base stations are connected to a mobile switching center (MSC) 602. A processor 603 associated with the MSC receives the signal measurements made by mobile stations 610. The processor then looks for a matching entry in database 604.

The present invention therefore provides a simple database look-up operation to determine the location of a mobile station within a given area serviced by the mobile network.

What is claimed is:

1. A method of locating a mobile station within a given cell, the method comprising the steps of:

transmitting to the mobile station a list of neighbor cell site frequencies;

receiving from the mobile station a set of measurements associated with said list of neighbor cell site frequencies;

comparing said set of measurements to a position location database comprising a plurality of positional information within the given cell, wherein said location database contains a set of measurements associated with the list of neighbor cell site frequencies for each of a plurality of geographic location coordinates within the given cell, and includes searching said location database for a set of measurements most closely matching the set of measurements received from the mobile station; and identifying, an approximate geographic location of the mobile station based on the results of the comparing operation.

2. The method of claim 1 wherein said step of identifying comprises the step of reading out from said database the geographic location coordinates corresponding to the set of measurements most closely matching the set of measurements received from the mobile station.

3. The method of claim 1 wherein said step of identifying comprises the step of extrapolating geographic location coordinates from the geographic location coordinates corresponding to the set of measurements most closely matching the set of measurements received from the mobile station.

4. The method of claim 1 wherein said step of comparing comprises the step of searching said location database for a predetermine number of sets of measurements most closely matching the set of measurements received from the mobile station.

5. The method of claim 4 wherein said step of identifying comprises the step of extrapolating geographic location coordinates from the geographic location coordinates corresponding to predetermined number of sets of measurements most closely matching the set of measurements received from the mobile station.

6. A method for generating a geographic location directory for a given cell site comprising the steps of:

determining a list of frequencies for cell sites neighboring the given cell site;

measuring signal characteristics of the frequencies from said list at a plurality of geographic coordinates within the cell site;

compiling said measured signal characteristics in a database whereby a set of measurements of the signal characteristics of the frequencies for the neighboring cell sites is correlated with a location defined by geographic coordinates from said plurality of geographic coordinates within the cell site;

extrapolating signal characteristics for a geographic location from said compiled measured signal characteristics; and storing said extrapolated signal characteristics for said geographic location in said database.

* * * * *